Patented May 1, 1923.

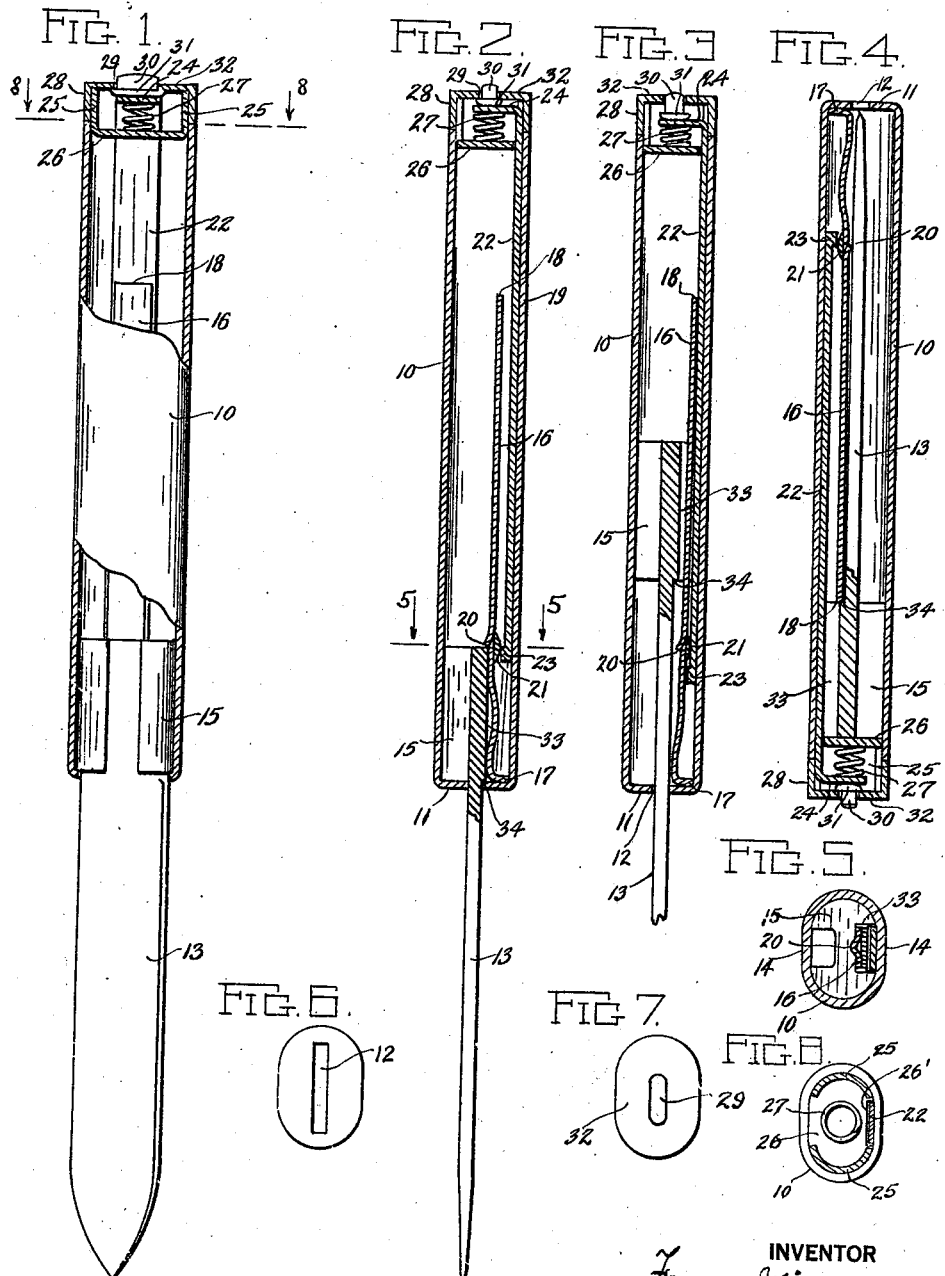

1,453,897

UNITED STATES PATENT OFFICE.

FRANZ VINCENT, OF BRIDGEPORT, CONNECTICUT.

POCKETKNIFE.

Application filed July 2, 1921. Serial No. 482,060.

*To all whom it may concern:*

Be it known that I, FRANZ VINCENT, a citizen of the United States, residing at 1140 Park Avenue, Bridgeport, county of Fairfield, State of Connecticut, have invented an Improvement in Pocketknives, of which the following is a specification.

This invention relates to a pocket knife, having a blade which may slide into the handle and be enclosed thereby when not in use. One of the objects of the invention is to provide a sliding blade with a head or shank fitting closely the interior of the casing so as to be held firmly in operative position. A further object of the invention is to provide an improved locking mechanism for controlling the position of the blade in retracted and extended positions, and also an improved means for controlling the locking mechanism. Other objects of the invention will become evident from a detailed description thereof.

Referring to the accompanying drawings;

Fig. 1 is a partial sectional elevation of my improved knife with the blade extended;

Fig. 2, a longitudinal central section at right angles to the section in Fig. 1;

Fig. 3, a section similar to Fig. 2, but showing the locking mechanism released and the blade partly retracted into the handle;

Fig. 4, a section similar to Figs. 2 and 3 showing the blade wholly retracted into the handle;

Fig. 5, a transverse section substantially on the line 5—5 of Fig. 2;

Fig. 6, an end view of the casing at the knife blade end;

Fig. 7, a plan view of the casing at the other end; and

Fig. 8 is a transverse section substantially on the line 8—8 of Fig. 1.

The casing 10 is preferably formed of a single piece of seamless tubing closed at one end 11, which end 11 is provided with a slot 12 through which the blade 13 passes. The tube or casing is preferably flattened on opposite sides, as at 14, to give it a substantially elliptical shape in cross section.

The blade is preferably formed in one piece with the shank or head 15, this shank being shaped, as shown in Fig. 5, to fit the interior of the casing 10, but this should be a sliding fit in order that the blade may freely move longitudinally of the casing to either extended or retracted position, and should have sufficient length to form a substantial bearing with the casing to prevent yielding of the knife blade in use. The oblong shape of the shank and handle prevents turning of the shank in the handle.

Secured within the casing at one side of the closed end is a spring locking element 16, the end of which is bent over at 17 and is secured to the closed end in any suitable manner such as solder or by means of a rivet. This spring is formed and connected to the casing in such a manner that the free end 18 tends to move toward the adjacent flat side 19 of the casing. Intermediate its ends at a distance from the end 17 equal to the length of the shank 15, the spring 16 is lanced and a portion thereof bent outwardly to form a shoulder 20, and on the opposite side of the spring from this shoulder, so as to extend above the surface of the spring, is a cam lug 21. Located between the spring 16 and the flat side 19 of the casing is a longitudinally extending flat releasing bar 22 provided at its inner end with an upstanding rib 23 adapted to co-act with the cam lug 21 upon the manipulation of the bar longitudinally of the casing to control the position of spring 16 in a manner presently to be described. At its other end, the releasing bar 22 is bent at right angles to form an operating finger 24 extending between the legs 25 of a substantially U-shaped spring support 26. This spring support is inserted within the open end of the casing 10 and may be secured therein, with the free ends of the legs 25 extending outwardly, by any suitable means, preferably by a forced fit. Any other suitable means, however, may be employed for securing it in position, and, if desired, a pin may be employed to limit its movement inwardly of the casing. A coil spring 27 is mounted between the closed portion of the support 26 and the finger 24, and tends to move the releasing bar 22 longitudinally of the casing away from the blade end or upwardly, as shown in Figs. 1, 2 and 3. The open end of the casing is closed by means of a cap 28 provided with an elongated slot 29. The sides of this cap embrace the legs 25 of the spring support and is secured to the end of the casing by a forced fit with these legs. The legs 25 of the spring support are curved to fit the inner curved walls of the casing 10 and cap 28, and the body portion is cut away at 26' to form a notch for the passage of bar 22. A button having a flat portion 30 projecting through the slot 29 and having a flange 31 located between the finger 24 and the flat end 32 of the cap 28, forms a convenient means for moving the releasing bar 22 against the action of the spring 27.

The shank 15 is provided on one flat side thereof with a groove 33 extending longitudinally and substantially throughout the length thereof. The spring 16 and the releasing bar 22 extend through this groove. At the end of this groove toward the knife blade, a shoulder 34 is formed for the purpose of locking the blade in a retracted position.

The operation is as follows:

When in extended position, as shown in Figs. 1 and 2, the blade is retained therein by the shoulder 20 on the spring 16 bearing against the inner end of the shank, as shown in Fig. 2, this shoulder being retained in this position by the rib 23 on the bar 22 bearing against the cam lug 21 on the spring 16 as the bar 22 is forced upwardly under the action of the spring 27. When it is desired that the blade be retracted into the casing or handle 10, the knife is turned with the blade extending upwardly and the button projection 30 is pressed inwardly moving the releasing bar 22 and carrying the rib 23 away from the position behind the cam lug 21, as shown in Fig. 2, to the position shown in Fig. 3. This allows the spring 16 to move over into contact with the bar 22 carrying the shoulder 20 away from the end of the knife blade shank and allows the blade to slide into the casing, the movement of the blade being limited by the end of the shank striking against the spring support 26. Upon release of the button, the releasing bar 22 is moved under the action of the spring 27 and the end 18 of the spring 16 is moved against the shoulder 34 under the camming action between the rib 23 and the cam lug 21. It will thus be seen the blade will be securely locked within the casing. When it is desired to again use the knife, the casing is held with the end containing the knife slot downward. The projecting button end 30 is pressed inwardly shifting the bar 22 to move the rib 23 away from the cam lug 21 to allow the spring end 18 to move away from the shoulder 34 to release the knife blade. When the blade is fully extended, release of the button allows the spring 27 to shift the bar 22 to cause the members 23 and 21 to co-act to move the shoulder 20 in front of the end of the blade shank to lock it in this position.

It will be apparent that the device is simple in construction comprising few parts and is, therefore, not liable to get out of order. It will also be apparent that the blade is securely locked in either its extended or retracted position, but may be easily released from either of these positions to allow movement to the other. Altho I have illustrated and described a knife blade in connection with the disclosure of my invention, it is not limited thereto as obviously various instruments may be employed instead of the knife blade, such as button-hooks, nail-files and so forth.

Having thus set forth the nature of my invention, what I claim is:

1. A device of the class described, comprising a tubular handle, an instrument provided with a shank guided to slide within said handle and having longitudinally spaced shoulders thereon, a spring latch extending longitudinally within and secured to the handle and provided with shoulders adapted to co-act with the shoulders on the instrument shank to lock the same in either extended or retracted position, and means including a cam element operable from the exterior of the handle for controlling said spring.

2. In a device of the class described, a tubular handle, an instrument guided to slide within said handle to exposed or retract the same, a spring blade in the handle secured thereto and extending longitudinally thereof and provided with longitudinally spaced stop shoulders adapted to cooperate with the instrument to detain it in either extended or retracted position, and means including a cam element operable exteriorly of the handle to control the operation of said spring.

3. In a device of the character described, a tubular handle, an instrument guided within said handle and adapted to move to an exposed position without the handle or to a concealed position within the handle and having longitudinally spaced shoulders, a flat spring within the handle secured thereto and extending longitudinally thereof and provided with stop shoulders adapted to cooperate with the shoulders on the instrument to lock it in either the exposed or concealed position, and means for controlling the action of said spring including a cam element operable from the exterior of the handle.

4. In a device of the character described, a tubular handle, an instrument guided for sliding movement in said handle, a locking spring in the handle and adapted to lock the instrument in either extended or retracted position, said spring being secured to the handle and tending to move to unlocking position, and means for holding the spring in locking position comprising a slidable bar, co-acting cam elements on the spring and bar, and means operable from the exterior of the handle for sliding the bar to release the spring.

5. In a device of the character described, a tubular handle, an instrument mounted to slide within said handle, and provided with longitudinally spaced shoulders, a locking spring secured within the handle and provided with longitudinally spaced shoulders cooperating with the shoulders on the instrument to lock it in either extended or retracted position, said spring being secured to the handle and tending to move to unlocking position, and means for retaining the spring in locking position comprising a bar between the spring and inner wall of the handle, cooperating cam elements carried by the spring and bar and tending to move the spring to locking position, and means for reciprocating the bar comprising a spring tending to move said bar to locking position and a button extending to the exterior of the handle and adapted to move the bar against the action of the latter spring to release the locking spring.

6. In a device of the class described, a tubular handle, an instrument having a shank fitted to slide within said handle and provided with a longitudinal groove in one side thereof having longitudinally spaced shoulders, a locking spring in said groove secured to the handle and having longitudinally spaced shoulders co-acting with the first mentioned shoulders to lock the instrument in either extended or retracted position, and means operable from the exterior of the handle and movable longitudinally thereof for controlling the operation of said locking spring.

7. In a device of the character described, a tubular handle, an instrument guided to slide in said handle and provided with longitudinally spaced shoulders, a locking member movable transversely of the handle and secured thereto and provided with longitudinally spaced shoulders co-acting with the shoulders on the instrument to lock it in either extended or retracted position, and means for shifting said locking member transversely of the handle comprising a bar shiftable longitudinally of the handle, and means for shifting the bar operable from the exterior of the handle.

8. In a device of the character described, a tubular handle, an instrument guided to slide within the handle, means for locking the instrument in either an extended or retracted position, means for controlling the locking means comprising a slidable bar extending longitudinally of the casing and bent at right angles at one end, a spring support within the casing, a spring bearing at opposite ends on said support and the end of said bar, and a button operable from without the casing and bearing on said end of the bar on the opposite side thereof from the spring.

9. A device of the class described, comprising a tubular handle, an instrument provided with a shank guided to slide within said handle, a single spring element extending longitudinally within the handle and secured thereto, coacting means carried by the shank and spring element for locking the instrument in extended position, coacting means carried by the shank and spring element for locking the instrument in retracted position, and means including a cam element operable from the exterior of the handle for controlling the spring element.

In testimony whereof I affix my signature.

FRANZ VINCENT.